United States Patent [19]

Miserlis et al.

[11] 4,068,060
[45] Jan. 10, 1978

[54] METHOD OF REMOVING OLIGOMERS FROM OLEFIN MONOMER VAPOR IN THE POLYMERIZATION OF OLEFINS

[75] Inventors: Constantine D. Miserlis, Arlington; Peter J. Lewis, Andover, both of Mass.

[73] Assignee: The Badger Company, Inc., Cambridge, Mass.

[21] Appl. No.: 728,066

[22] Filed: Sept. 30, 1976

[51] Int. Cl.² .......................... C08F 6/00; C08F 10/00
[52] U.S. Cl. ......................................... 526/68; 526/77
[58] Field of Search ....................................... 526/68, 77

[56] References Cited
U.S. PATENT DOCUMENTS

| | | | |
|---|---|---|---|
| 3,255,171 | 6/1966 | Eilbracht et al. | 526/68 |
| 3,403,080 | 9/1968 | Clay | 526/68 |
| 3,523,929 | 8/1970 | Paige et al. | 526/68 |
| 3,634,300 | 1/1972 | Fischer et al. | 526/68 |
| 3,770,709 | 11/1973 | Tegge et al. | 526/68 |
| 3,953,301 | 4/1976 | Mendez et al. | 526/68 |

*Primary Examiner*—Alan Holler
*Attorney, Agent, or Firm*—Sewall P. Bronstein

[57] ABSTRACT

Removing oligomers (short chain polymers of from two to seven atoms in the chain) from olefin monomer vapor recovered for recycle from the reaction mass resulting from the catalytic polymerization of liquid olefinic monomers by flowing such recovered vapor through a mass transfer plate tower upwardly through openings in the plates of said tower and in the form of bubbles through layers of liquid oligomer reflux maintained on said plates by weirs and downcomers by means of which said reflux is flowed from each plate downwardly to the plate below it and, as a layer, along the top of the plate and thence downwardly to the next lower plate, condensing in a reflux condenser the vapor from the top of said tower, removing olefin monomer from said condenser as a vapor and refluxing condensed liquid oligomers back to the top of said tower. Preferably the tower is a valve tray tower and the plates are valve trays.

8 Claims, 2 Drawing Figures

METHOD OF REMOVING OLIGOMERS FROM OLEFIN MONOMER VAPOR IN THE POLYMERIZATION OF OLEFINS

THE PROBLEM

In the catalytic liquid phase polymerization under positive pressure of olefins to polyolefins, such as polyethylene, polypropylene, polybutylene, etc., the reaction mass comprises polyolefin dissolved in liquid monomer. The monomer is recovered from the dissolved polymer by flashing and is recycled. However, before recycle it is necessary to remove oligomers from the flashed monomer vapor. This is conventionally done by passing it through a quenching tower in which the less volatile oligomers are stripped as a liquid from the monomer vapor. The monomer is then compressed to a liquid and recycled back to the reactor together with fresh olefin monomer feed.

In view of the nature of the flashed monomer vapor and the theoretical difficulty in separating very small amounts of oligomer from such vapor, the quenching tower utilized for removing oligomer has been a packed tower packed with a high efficiency packing.

These packed towers have presented the following serious problems. After operation for a relatively short time, pressure drop across the tower commences to increase and continues to do so with consequent flooding problems until the system becomes fouled thereby requiring frequent shut downs and replacement of the relatively expensive packing with fresh packing at substantially increased cost and decrease in production. Further, during a large part of the operating time between replacements of packing, the pressure drop is relatively high thereby requiring increased power at increased cost.

It is believed that these problems are due to the peculiar and unpredictable nature of the flashed olefin monomer vapor for recycle and are unique to this system, in which the flashed monomer vapor contains small amounts of polyolefin which evidently come up in the quenching tower with the vapor, probably by entrainment, and fall out on and adhere to the packing surfaces as a sticky mass thereby increasing pressure drop and eventually fouling the packing. It is believed that this polymer comes off with the monomer vapor flash during flashing.

BRIEF DESCRIPTION OF THE INVENTION

In accordance with the present invention the aforesaid problems are eliminated by passing the flashed monomer vapor through a mass transfer plate tower, such as a valve tray or sieve tray or bubble cap tray tower, with conventional reflux condenser. The flashed monomer vapor flows upwardly through the openings in the plates and, as bubbles, through the layers of liquid oligomer reflux maintained on the plates by the weirs and downcomers by means of which the liquid oligomer reflux flows downwardly from each tray to the tray below it, along the top of the latter tray as a liquid layer and thence to the next lower tray. The monomer is removed from the condenser as a vapor. The less volatile cooled condensed liquid oligomer is refluxed back to the top of the tower to quench the upcoming vapor and thereby condense out more liquid oligomers which join the downwardly flowing reflux.

Surprisingly enough with the use of mass transfer plates in accordance with the invention, pressure drop does not increase after operation has commenced and fouling of the trays with consequent flooding and frequent interruptions in production does not occur. Also, even though the mass transfer plates are not as efficient as a packed tower with high efficiency packing, it has been found that the very small amounts of oligomer in the monomer vapor are effectively and efficiently removed. Accordingly, in accordance with the present invention, the aforesaid problems are eliminated while still achieving the same oligomer removal.

Evidently, either the polymer contained in the monomer vapor does not fall out, or if it falls out, it does not adhere to the plate surfaces as it does to the packing surfaces, but rather is carried with the liquid oligomer down to the bottom of the tower. Also, it may be that some of the polymer falls out but to a lesser extent which does not create the aforesaid problems presented with packed towers.

Preferably, the mass transfer tower is a conventional valve tray tower, which provides a more stable pressure drop over a wider range of pressures than other types of mass transfer plates.

The number of plates depends directly on the polyolefin plant capacity based on about 15 to 25 plates for a 15,000,000 pound polyolefin per year plant capacity.

DESCRIPTION OF THE DRAWINGS

The advantages of the invention will be further understood from the following drawings and detailed descriptions thereof in which drawings

DETAILED DESCRIPTION OF THE INVENTION

Figure 1:
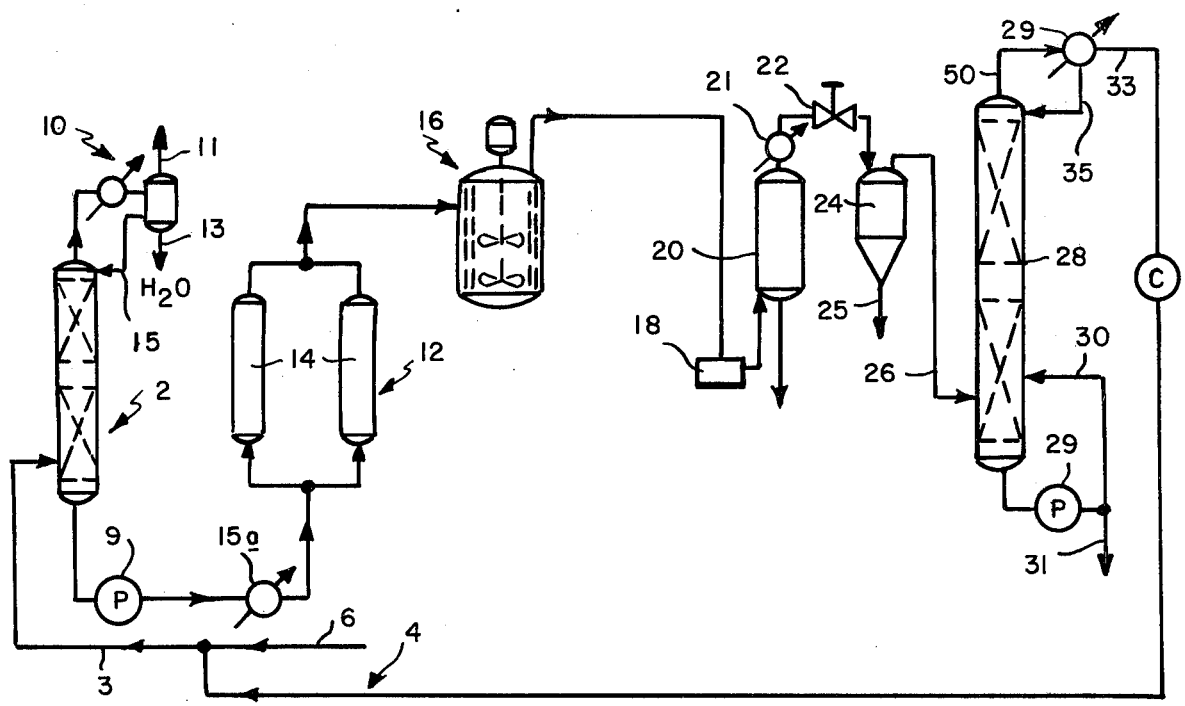
FIG. 1 is a schematic flow sheet of a method embodying the present invention.

With reference to the figures, 2 represents a stripping column, e.g. a conventional packed tower, for stripping water and light ends from the mixture 3 of liquid monomer recycle 4 and fresh liquid monomer feed 6, both of which are under sufficient positive pressure to maintain them in a liquid state. Light ends are removed as a vapor at 11 from reflux condenser 10. Condensed olefin monomer is refluxed back to the top of tower 2 via 15 and condensed water is removed at 13.

The stripped liquid monomer from tower 2 is pumped by pump 9 through cooler 15a to reduce its temperature to well below reaction temperature and thence to a conventional molecular sieve dryer 12 having two beds 14, which are cyclically switched by switching valves (not shown) on and off stream. The off-stream bed is regenerated to dry it by heating it and passing a regenerating gas through it while liquid monomer is passing through the on-stream bed.

The dried liquid monomer then flows to the liquid filled reactor 16 where it is admixed with catalyst and hydrogen (to control polymer chain length) while being strongly agitated.

The highly viscous reaction mass, comprising polyolefin dissolved in liquid monomer passes to mixer 18 where it is mixed with water to kill the catalyst and thereby stop further reaction.

The reaction mass then passes from mixer 18 to a settling tank 20 in which the heavier water, having catalyst dissolved therein, is separated from the reaction mass as a lower layer. The upper layer of reaction mass still made up of olefin polymer dissolved in liquid monomer then passes to a preheater 21 and thence through a flash (reducing) valve 22 over which there is a large pressure drop to flash off the more volatile monomer as a vapor from the polymer into a flash tank 24, from which the polymer is removed at 25 and is extruded, cooled and pelletized and from which the flashed monomer vapor flows via 26 to the lower portion of mass transfer plate quenching tower 28, where oligomers are stripped from the monomer vapor by a reflux stream of liquid oligomers. Vapor from the top of the tower 28 flows to a reflux condenser 29, from which the more volatile monomer vapors exit at 33 and from which the condensed liquid oligomers containing some monomer are refluxed via 35 back to the top of the tower to provide the reflux stream.

Part of the condensed liquid oligomer at the bottom of the tower is recycled back to the quench tower via pump 29 and line 30 and part is removed at 31.

The pressure of the monomer vapor 33 is raised by a compressor C to liquify it and the liquid monomer is recycled via line 4. It is believed that small amounts of polyolefin are carried up with the flash vapor 26 probably by entrainment and enter the quenching tower with the vapor 26.

Figure 2:
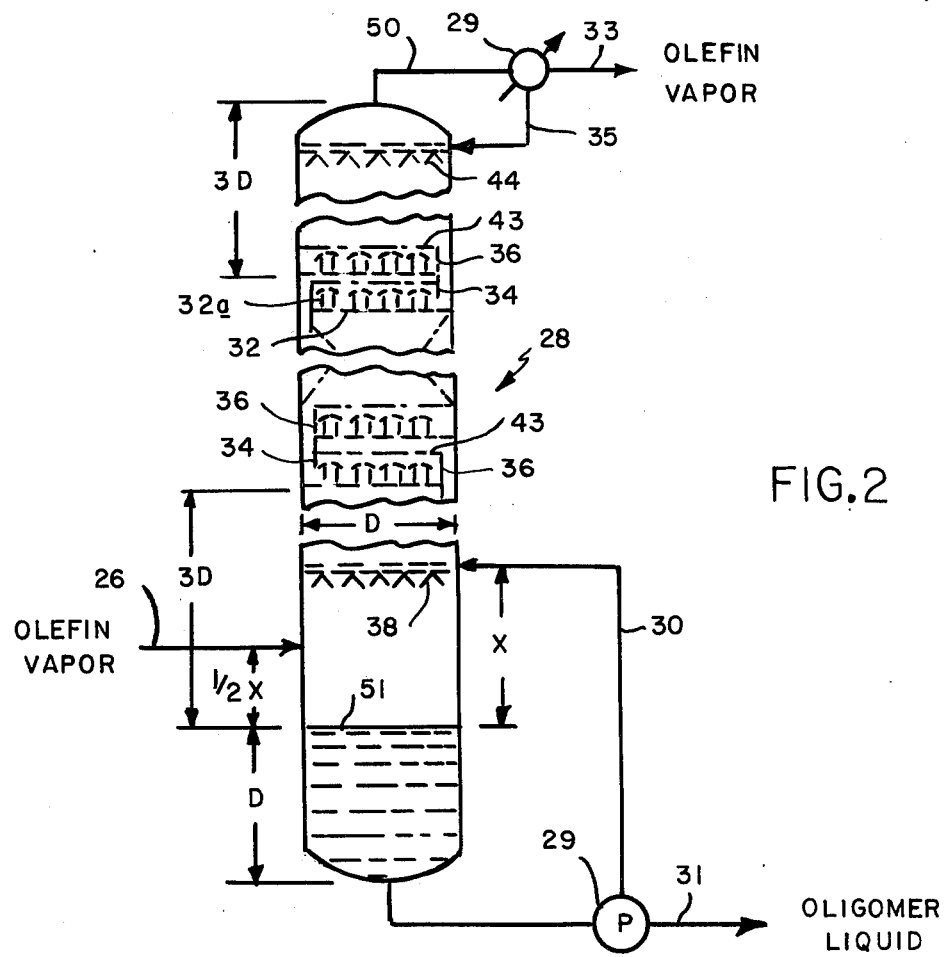
FIG. 2 is a schematic in elevation of the mass transfer plate quenching tower of FIG. 1.

The mass transfer plate stripping tower 28 (FIG. 2) is a valve tray tower made up of conventional valve trays 32, each of which has a plurality of valves 32a, a conventional downcomer 34 and a conventional weir 36. The number of trays depends upon the diameter and height of the tower which depends on the capacity of the plant. Accordingly, the number of plates depends directly on the polyolefin capacity of the plant using as a base from 15 to 25 valve trays for a 15,000,000 lb. polyolefin plant capacity per year.

The flashed monomer vapor enters tower 28 at 26 and flows upwardly through the valve openings in the valve trays 32 and through the valves 32a and, in the form of bubbles, through the layers 43 of liquid oligomer reflux maintained on the tops of the trays and moved along the trays by means of the weirs 36 and downcomers 34.

The monomer vapor from the top of the tower 28 passes via 50 to conventional reflux condenser 29 from which the olefin monomer leaves as a vapor at 33, and from which the less volatile cooled condensed liquid oligomers containing some monomer are refluxed back to the top of the tower via 35 through spray nozzles 44 and thence flow downwardly as aforesaid. As the hot monomer vapor flows upwardly in contact with the downcoming cool liquid reflux, oligomer is condensed out of the vapor and joins the flow of liquid reflux to the bottom of the tower.

Liquid oligomer containing some monomer at the bottom of the tower is pumped by pump 29 via 30 back to the tower at a level below the bottom plate and above the level 26 at which the flashed monomer vapor is introduced into the tower. Preferably the distance between the level 51 of the liquid oligomer in the tower and the level 26 at which the flashed vapor is introduced into the tower is one-half of the distance between level 51 and the level 30 at which the liquid oligomer is introduced into the tower. Also preferably, level 51 is about equal to the diameter of the tower and the distance between the top plate and the top of the tower and between the bottom plate and the bottom of the tower is equal to three times the diameter of the tower. Oligomer liquid is withdrawn from the system at 31.

Although valve trays are preferred, any mass transfer plates can be used, such as bubble cap trays, sieve trays, etc.

EXAMPLE

This example is given for a polypropylene plant having a capacity of 15,000,000 pounds of polypropylene per year.

The temperature, pressure, composition, construction and other properties of the various streams and equipment shown in FIG. 1 are set forth below with reference to the number representing the stream or element of the equipment appearing in FIG. 1.

Stream 6 — Fresh liquid propylene feed at a rate of 1880 lbs./hr. and at 70° F and 600 psig.

Stream 4 — Recycle liquid propylene recycled as described above at a ratio of recycle to fresh feed of 5 to 10 (7 is preferred) recycle to 1 fresh feed at a temp of 115° F and a pressure of 600 psig and containing less than 50 ppm of polymer.

Stripper 2 — Packed tower Liquid propylene monomer — stripping carried out at 170° F and 550 psig- moisture reduced to 50 ppm or less. Reduce water content of monomer to 10–20 ppm.

Cooler 15a — Entry to cooler 170° F and 560 psig. Exit from cooler 100° F and 550 psig.

Mol. Sieve Dryer 12 — Entry and exit 100° F — Entry at 550 psig. and exit at 540 psig — regeneration on offstream dryer at 300° F and atmospheric pressure.

Catalyst — Conventional Ziegler catalyst 0.5 to 1 lb. catalyst per 100 pounds of fresh monomer feed.

Hydrogen — 0.05 to 0.15 lbs per 100 pounds of fresh monomer feed to control polymer chain length.

Reactor 16 — Reactor Temp. 145° F. Pressure 450 psig. Completely liquid filled. Vigorous mixing to ensure good mixing of catalyst and $H_2$ with liquid monomer Reaction mass outlet — polypropylene dissolved in liquid propylene monomer at 145° F and 450 psig. Ratio of polymer to liquid monomer — 20% Reaction mass — highly viscous Mixer 18 — Reaction mass inlet — same as reaction mass outlet of reactor 16 Motionless Mixer (high shear intensive mixer) sold under that name by Kenics Incorporated Monel Water added at 150° F. Exit is 180° F-$\Delta$T by heat of mixing-and 700 psig.

Settler 20 — Inlet and outlet 180° F and 700 psig. Residence time $\frac{1}{2}$-2 hours — polymer in monomer oil phase goes to top — aqueous phase containing catalyst goes to bottom and is removed, neutralized and discarded.

Heat Exchanger 21 — Inlet 180° F and 2500 psig achieved by pump (not shown) between settler 20 and heater 21 Outlet 380° F and 2000 psig. Heating fluid — high boiling Dowtherm sold by Dow Corp. at 470–500° F.

Flash Valve 22 — Mason Neilan reducing valve — inlet 380° F and 2000 psig — outlet 1500 psig and 300° F — Flashed monomer vapor contains less volatile oligomers and entrained polymer Flash Drum 24 — Same conditions as exit from 22 Polymer exits at 25 Flashed monomer vapor with oligomers and entrained polymer exits at 26

Quenching Tower 28 — Conventional valve tray tower having 18 trays with 25 valves each — tower diameter (D) of 3 ft. — tower height of 40 ft. Inlet monomer vapor at 300° F and 1500 psig Liquid oligomer at 31 and 30 — 60° F at 150 psig (back pressure control valve) Outlet monomer vapor at 33 is 50° F and 150 psig (back pressure control valve)

The above description and accompanying drawings of a preferred embodiment of the invention are for purposes of illustration only and it is not intended that the invention be limited thereto or thereby but only to the methods claimed in the appended claims and their equivalents.

It will be understood that with polyolefins other than polypropylene the pressures must be adjusted to make sure that the olefin monomer is maintained in a liquid state.

We claim:

1. In a method of catalytically polymerizing olefins from liquid olefin monomer under positive pressure, in which the reaction mass comprises polyolefin dissolved in liquid monomer, in which the liquid monomer is recovered from the reaction mass as a vapor and in which the vapor is quenched to remove oligomers therefrom and is subsequently recycled back to the reactor as a liquid, the improvement comprising quenching said vapor to condense said oligomers out of it as a liquid by passing it through a mass transfer plate tower.

2. In a method of catalytically polymerizing olefins from liquid olefin monomer under positive pressure, in which the reaction mass comprises polyolefin dissolved in liquid monomer, in which the liquid monomer is recovered from the reaction mass as a vapor consisting of monomer plus oligomers and in which the vapor is quenched to remove the oligomers therefrom and is subsequently compressed and recycled back to the reactor as a liquid, the improvement comprising quenching said vapor by passing it upwardly through openings in the plates of a mass transfer plate tower and, as bubbles, through layers of oligomer-rich liquid reflux maintained on and moving along said plates by weirs and downcomers by means of which oligomer-rich liquid reflux flows downwardly from each plate to the plate below it and along such plate and then downwardly to the next lower plate, passing the vapor from the top of the tower through a reflux condenser wherein the less volatile oligomers are removed from the monomer vapor and the cooled, condensed liquid oligomers containing some monomer are refluxed back to the top of the tower for said downward flow therethrough to quench said upwardly moving vapor.

3. A method according to claim 2, including recycling liquid oligomer collected at the bottom of said tower back to the tower.

4. A method according to claim 3, said liquid oligomer being recycled back to said tower at a height above the height of the entry of said monomer vapor to said tower.

5. In a method according to claim 3, said recycle of liquid oligomer being introduced into said tower at a level below the lowest plate of said tower and said monomer vapor being introduced into said tower at a level below said entry of said oligomer recycle and above the liquid level in said tower.

6. In a method according to claim 5, said oligomer recycle being introduced into said tower as a spray.

7. In a method according to claim 2, said tower being a valve tray tower and said plates being valve trays each having a plurality of valves through which said vapor flows.

8. In a method according to claim 7, the number of valve trays being between 15 to 20 trays.

* * * * *